Nov. 12, 1968  J. R. YOUNKIN  3,409,992
PICTORIAL TURN AND BANK INDICATOR
Filed May 19, 1966
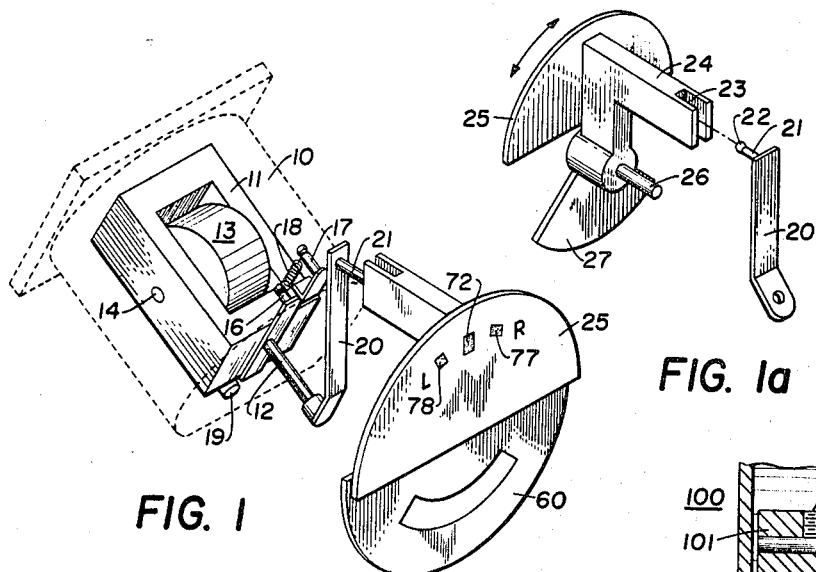
FIG. 1
FIG. 1a
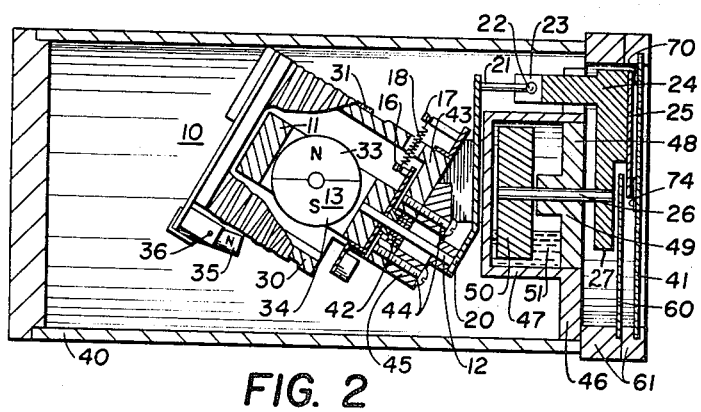
FIG. 2
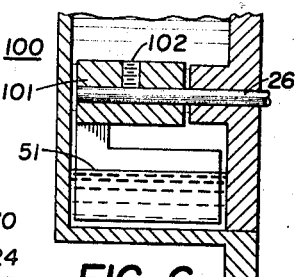
FIG. 6
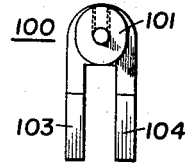
FIG. 7
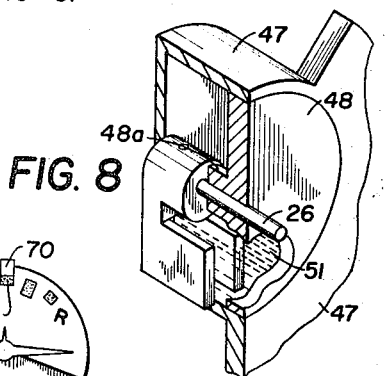
FIG. 8
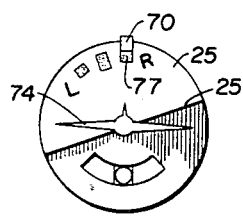
FIG. 4
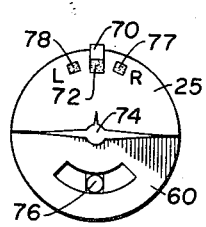
FIG. 3
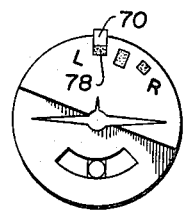
FIG. 5
INVENTOR
JAMES R. YOUNKIN
Richards Harris & Hubbard
ATTORNEY

United States Patent Office 3,409,992
Patented Nov. 12, 1968

3,409,992
PICTORIAL TURN AND BANK INDICATOR
James R. Younkin, Mineral Wells, Tex., assignor, by mesne assignments, to Thurman & Younkin, Inc., a corporation of Texas
Filed May 19, 1966, Ser. No. 551,429
10 Claims. (Cl. 33—204)

ABSTRACT OF THE DISCLOSURE

A turn indicator for an aircraft includes a rate gyro rotatable on a first axis oriented at a preselected angle between the roll and yaw axes of the aircraft in addition to marked indicator mask directly coupled to the rate gyro and mounted for rotation on a second axis parallel to the roll axis of the aircraft. Reference indicia is mounted fixedly in relation to the aircraft and extends over the face of the marked indicia mask to provide an indication of the rate of turn of the aircraft when the mask is moved by the rate gyro. A rotatable damping element applies a damping force to the indicator mask and the rate gyro during the operation thereof.

---

This invention relates to an indicator for an aircraft and more particularly to a rate of turn indicator which employs a force developed by a gyro, the magnitude of which is proportional to the sum of roll and azimuth velocities. In a further aspect, the invention is directed to a tilted rate gyro directly linked to an indicator mask and in which a damping force is applied to the entire gyro-indicator linkage.

Turn and bank indicators in the past have generally involved the use of a pointer or needle mounted below or at the bottom of the face of a suitable scale. The pointer is generally operated in conjunction with a skid indicator responsive to a centrifugal force on a ball in a liquid filled arcuate tube. Such prior art devices have involved a reversal of direction of movement of the pointer relative to the actual relative movement between a roll sensing gyro and the aircraft frame. Further, displays provided through the use of such pointers are not as logical as might be desirable.

In accordance with this invention, an improved turn indicator is provided for an aircraft. A rate gyro is mounted for rotation on a first axis oriented at a predetermined angle between the roll and yaw axes of the aircraft. An indicator mask is mounted for rotation on a second axis parallel to the roll axis. A reference indicia mounted in fixed relation to said aircraft covers a portion of the face of the mask. A linkage directly couples the mask to the rate gyro for positive control of relative movement between the indicia and the mask.

Preferably, a ball-slot linkage is employed to transfer rotation of the gyro relative to the air frame into a proportional movement of the mask relative to the air frame even though the mask is mounted on an axis oriented at an angle to the axis of the gyro.

In a preferred embodiment of the invention, a fluid-containing cylindrical cup, symmetrical to the mask axis, has a coaxially protruding closure member supporting a shaft. The mask is mounted on one end of the shaft and a damper is mounted on the other end for rotation within the cup corresponding with rotation of the mask. The damper reacts with the fluid to dampen both the mask and the gyro.

For a more complete understanding of the present invention and for further objects and advantages thereof, reference may now be had to the following description taken in conjunction with the accompanying drawings in which:

FIGURE 1 is an isometric view, partially schematic showing a gyro linkage embodied in the present invention;

FIGURE 1a is a rear exploded view of the actuator arm-card linkage embodied in the present invention;

FIGURE 2 is a vertical longitudinal sectional view of one embodiment of the indicator of the present invention;

FIGURE 3 illustrates the display for a level flight;

FIGURE 4 illustrates the display for a full right turn;

FIGURE 5 illustrates the presentation for a full left turn;

FIGURE 6 is a side view of the damper;

FIGURE 7 is an end view of the damper; and

FIGURE 8 is an isometric view partially in section showing the mounting of the damper of FIGURES 6 and 7.

Referring now to FIGURE 1, a rate gyro assemblage 10 comprising a frame 11 mounted for rotation about the axis of a shaft 12. A rotor 13 spinning about a transverse axis is mounted in frame 11 for rotation with the frame about the axis of a shaft 14. An arm 16 secured to frame 11 is coupled to an arm 17 by a spring 18. The arm 17 is secured to the housing for the gyro 10. A weight 19 is supported below the frame 11 and is coupled to the frame 11 for movement therewith. The axis of the shaft 12 is oriented at an angle of about 30° relative to the longitudinal axis of an aircraft. Thus the gyro 10 produces a force on the shaft 14 which is proportional to roll velocity. The spring 18 tends to restore the position of the gyro.

An arm 20 is secured to the end of the shaft 12 and extends vertically upward with an arm 21 extending parallel to the longitudinal axis of the aircraft when the aircraft is in level flight. As best shown in FIGURE 1a, the arm 21 terminates in a ball 22. The ball 22 operates in an elongated slot 23 formed in an arm 24 which extends from and is coupled to a semicircular mask 25. The mask 25 is pivoted for rotation about the axis of a shaft 26. A counter weight 27 is secured to the rotating structure to provide a rotating unit which, with reference to the shaft 26, is balanced. The elements involved in the structure rotating on the shaft 26 may be selected as to dimensions and/or mass to balance the structure. It will be understood that the elements 24, 25, and 27 are integrally formed or rigidly coupled to the other.

The ball 22 operating in the slot 23 permits the translation of the motion of the frame 11 on the tilted axis of the shaft 12 into a corresponding and proportional rotation of the display mask 25 as it rotates on shaft 26.

As best shown in FIGURE 2, the rate gyro 10 having frame 11 therein is mounted inside a cylindrical housing 30 having a coil 31 wound on the surface thereof. The disk 13 is a permanent magnet having a north pole portion 33 and a south pole portion 34. The coil 31 is excited with alternating current to establish an alternating magnetic field to which the rotor 13 responds. A small bar magnet 35 pivoted on a shaft 36 responds to variations in the magnetic field of the rotor 13 at low speeds and may be employed to open and close an excitation circuit (not shown) during start up of the rotor 13. However, the rotor may be driven up to a speed synchronous with the frequency of the voltage applied to coil 31 through any of a number of well-known procedures. Preferably, only after the synchronous speed has been attained by rotor 13 will the unit be operated to display variations in the attitude of the aircraft.

It will be noted that the frame 11 is mounted at an angle of about 30° relative to the axis of the housing 30. The housing 30 is designed to be mounted in the instrument panel of an aircraft with the front face transparent plate 41 serving as a closure for case 40. The longitudinal axis of the case 40 is mounted parallel to the longitudinal axis of the aircraft with the shaft 12 tilted downward and aft, toward the pilot.

The frame 11 is mounted for rotation on bearings 42 which are journalled in an aperture in the end plate 43 of the housing 30. Screws 44 serve to secure the gyro 10 to a mounting bar 45 which extends laterally across the housing 30. Bar 45 has a face thereof oriented at an angle of 60° to the longitudinal axis of the housing 30. The lower end of the arm 20 extends perpendicular relative to the axis of shaft 12. The upper portion of the arm 20 is normally in a vertical plane. The mounting bar 45 forms a part of a casting 46 which is mounted in the front end of the cylindrical case 40.

The casting 46 includes a cylindrical cup or recess 47. A closure disk 48 in the mouth of the cup 47 forms a bearing 49 through which the shaft 26 passes. A damping disk 50 is mounted on the end of the shaft 26 within the cup 47. A damping fluid 51 partially fills the cup 47 to coact with the disk 50. By this means, the mask 25 is maintained in the same orientation as the frame 11. In the direct coupling through the ball 22 and slot 23 all of the force produced by the rate gyro 10 is utilized in holding the mask 25 fixed even through the aircraft changes attitude. By this means the response of the indicator as a whole is rapid and positive. The damping produced by the disk 50 and the liquid 51 can be substantial damping force without undesirably modifying the action of the indicator. Further, by use of the structure shown in the cup 47 and the closure disk 48, leakage of the damping fluid 51 is eliminated. More particularly, the damping fluid cannot attain any condition such that it will tend to flow out along the shaft 26.

As the aircraft rotates relative to the frame 11, the arm 21 will become twisted relative to the sides of the slot 23. The enlarged ball 22 on the end of the arm 21 accommodates the compound motion of the arm 21 to control the arm 24 without binding in the slot.

In FIGURE 2, a semi-circular mask 60 is mounted in a fixed relation in the front frame 61 of the indicator. Similarly, the face plate 41 is mounted in fixed relation on the frame 61. Thus, as the aircraft changes attitude, the mask 25 remains fixed under control of the rate gyro. The resulting apparent display is shown in FIGURES 3–5.

In FIGURE 3, the display for level flight is shown. An index tab 70 is mounted inner face of plate 41. In level flight, it is in registration with a middle index marker 72 carried by mask 25. A silhouette 74 of an aircraft is also mounted on the plate 41. In level flight, the wing tips of the silhouette 74 are in alignment with the lower edge of the mask 25. A skid indicator 76 (not shown in FIGURE 2) is mounted behind the lower disk 60 and is viewed through an arcuate slot in the disk 26 in a manner generally employed in turn and bank instruments.

It will be noted that index markers 77 and 78 are also mounted on the face of the mask 25 to the right and to the left of the central marker 72. Markers 77 and 78 are the same width as marker 72 and are spaced from marker 72 a distance equal to the width thereof.

As shown in FIGURE 4, the index tab 70 is in registration with the marker 77 indicating a full right turn is being executed. The silhouette 74 of the aircraft thus indicates the precise relationship between the aircraft and the horizon which is represented by the lower edge 25A of the mask 25.

The linkage and the size of the tab 70 and markers 72, 77, and 78 and their location are so interrelated that a full turn of 180° per minute will be executed when the tab 70 is in registration with the marker 77. Similarly, FIGURE 5 illustrates the operation of the indicator for a full left turn. The tab 70 is in registration with the marker 78. A half turn, executed at the rate of 90° per minute may thus be accurately executed by moving the tab 70 midway between the marker 72 and the marker 77 and 78.

The damping fluid 51 may be a Dow Corning Silicon Viscous Fluid or any like material which has a substantially constant viscosity with temperature. The damping disk 50 may be a plane disk or may be provided with apertures, paddles or other structures depending upon the damping desired.

The rate gyro 10, as shown, represents one form of rate gyro. It has been employed in this embodiment because of its small size and adaptability to this particular operation. It will be recognized, however, that other rate gyro structures may be employed. The indicator of the present invention is advantageous in that the mask moves relative to the air frame, in contrast to prior devices in which the mask moves with the air frame. It is important to note the basic difference in concept wherein the present display agrees with the artificial horizon. The index at the top of the mask makes it convenient to execute a timed one-half and full standard. Further, it permits the maintenance of straight and level flight because of the equal widths of the index markers 70 and 72 in their full overlapping relation. More important, however, is the fact that the positive coupling between the mask and gyro provides for rapid and positive response of the indicator. For this reason the rigid coupling permits timed turns to be executed with more precision than with prior systems. The rigid coupling brings about damping the entire gyro, not just the indicator portion itself as in prior systems.

It will be appreciated that the rate gyro may be tilted at angles other than 30°. The orientation represents a compromise between the bank angle and heading response of the indicator. Thirty degrees has been found to be optimum for damping employed in accordance with the foregoing description. The higher the damping rate the greater angle that can be accommodated. By this means, the indicia in the form of the aircraft silhouette 74 is substantially symmetrical to and intersects the second axis. The tips of the wings on the silhouette when in straight flight are maintained in stable registration with the straight lower edge of the mask disk.

Thus, the indicator is based upon use of a rate gyro which is mounted for rotation on a first axis oriented at a predetermined angle between the roll and yaw axes of the aircraft and in the plane common to the roll and yaw axes. An indicator mask is mounted for rotation on a second axis parallel to the roll axis with a reference indicia mounted in fixed relation to the aircraft as to extend across the face of the mask preferably substantially symmetrical to the second axis. A bracket extends from the gyro and has an actuator arm. The arm extends parallel to the second axis when said aircraft is in level flight. An element secured at one end to the mask has a slot at the other end parallel to a plane passing through the second axis. A ball secured on the arm operates in the slot to provide a direct coupling between the mask and gyro for positive control of relative movement between the indicia and mask.

Preferably a cup symmetrical to the second axis contains a damping fluid and damper mounted for rotation with the mask but within the cup and reacts with the fluid to damp the mask and gyro.

In FIGURES 6–8, a preferred embodiment of the damping structure has been illustrated. FIGURE 6 shows shaft 26 with a damper 100 having a hub section 101 secured to the shaft 26 by a set screw 102. Two paddles 103 and 104 extend downward from the hub 101. Thus, a lightweight but effective damper is employed for cooperation with the damping liquid 51. The cup 47 is provided with the closure dask 48. The closure disk 48 has a coaxial protrusion 48a which forms a hub or bearing in which the shaft 26 is journaled. The extremities of the paddles 103 and 104 extend beneath the protrusion 48a to maximize the contact area with the damping fluid 51.

By use of such structure, liquid 51 cannot leak out of the cup 47 even though the unit may be positioned with the outer face of the closure disk 48 horizontal and facing downward. In the latter extreme position, the liquid flows into the lower area surrounding the protrusion 48a. The liquid is of quantity insufficient to inundate the protrusion 48a when in the extreme position above noted. Thus, the shaft 26 may be journaled for free rotation in the closure disk 48 in a journaling structure which prevents leakage of the fluid and thus assures damping action regardless of aircraft attitude. Even in the extreme position, the ends of the paddles extending under protrusion 48a confront the inner face of the closure plate 48 for contact with the damping fluid.

What is claimed is:

1. A rate of turn indicator for an aircraft which comprises:
    (a) a rate gyro mounted on a first element fixed relative to the aircraft for rotation about a first axis oriented at a predetermined angle between the roll and yaw axes of said aircraft,
    (b) a marked indicator mask mounted on a second element for rotation about a second axis parallel to said roll axis,
    (c) a reference index mounted in fixed relation to said aircraft extending over the face of said mask, and
    (d) means mounted with said first element on said aircraft for rotation about said first axis for directly coupling said mask to said rate gyro for positive control of relative movement between said index and said mask.

2. The combination set forth in claim 1 in which said mask is a semi-circular disk and said index is an aircraft silhouette intersecting said second axis and normally in registration with the straight edge of said disk.

3. The combination set forth in claim 1 in which a fluid-containing cylindrical cup symmetrical to said second axis has a coaxial protrusion supporting a shaft at said second axis with said mask mounted at one end of said shaft and on the other end there is mounted a damper for rotation within said cup corresponding with rotation of said mask to react with said fluid to dampen both said mask and said gyro.

4. The combination set forth in claim 1 in which said reference index is a tab fixed to the case of said indicator and extends across the margin of said mask and wherein a plurality of markers on said mask adjacent said margin are movable with said mask through positions of registration with said tab.

5. The combination set forth in claim 4 in which the widths of said tab and said markers are equal and wherein said markers are spaced one from another by distances equal to said widths.

6. The combination set forth in claim 1 in which the coupling between said gyro and said mask includes a ball-slot coupling for transmitting the force developed by said gyro to said mask.

7. The combination set forth in claim 6 in which a rotatable damping element is mounted rigidly to said mask and rotates in a viscous damping fluid.

8. A turn indicator for an aircraft which comprises:
    (a) a rate gyro mounted on a first element fixed relative to the aircraft for rotation about a first axis oriented at a predetermined angle between the roll and yaw axes of said aircraft,
    (b) an indicator mask mounted on a second element for rotation about a second axis parallel to said roll axis of said aircraft,
    (c) a reference index mounted in fixed relation to said aircraft extending across the face of said mask to interest said second axis,
    (d) a bracket extending from said rate gyro for rotation about said first axis and having an arm thereon which is parallel to said second axis when said aircraft is in straight flight,
    (e) an element secured at one end to said mask and having a slot at the other end parallel to a plane passing through said second axis, and
    (f) a ball secured on said arm and operating in said slot directly to couple said mask to said rate gyro for positive control of relative movement between said index and said mask.

9. The combination set forth in claim 1 wherein said rate gyro produces an output force proportional to the roll velocity of said aircraft and in which said first axis is oriented at an angle of about 30° relative to the roll axis of said aircraft with the axis of said gyro directed aft and downward.

10. The combination set forth in claim 1 in which a rotatable damping element coupled to said second element on said second axis applies a damping force to said mask and said gyro.

References Cited

UNITED STATES PATENTS

| | | | |
|---|---|---|---|
| 1,955,488 | 4/1934 | Crane et al. | 33—204.1 |
| 2,199,256 | 4/1940 | De Florez | 33—204.1 X |
| 2,366,543 | 1/1945 | Meredith | 33—204 |
| 2,387,938 | 10/1945 | Noxon | 33—204.1 |
| 2,602,239 | 7/1952 | Wrigley | 74—5.5 X |
| 2,770,051 | 11/1956 | Dreves | 33—204.1 |
| 2,823,464 | 2/1958 | Snodgrass | 33—204.1 |
| 3,208,426 | 9/1965 | Coffing | 33—204.2 X |

WILLIAM D. MARTIN, JR., Primary Examiner.